US012571726B2

(12) United States Patent
Pyayt et al.

(10) Patent No.: US 12,571,726 B2
(45) **Date of Patent: *Mar. 10, 2026**

(54) SYSTEMS AND METHODS FOR ANALYZING LIQUIDS

(71) Applicant: University of South Florida, Tampa, FL (US)

(72) Inventors: Anna Pyayt, Tampa, FL (US); Edikan Archibong Ogunnaike, Riverview, FL (US); Harry Tuazon, North Charleston, SC (US)

(73) Assignee: University of South Florida, Tampa, FL (US)

( * ) Notice: Subject to any disclaimer, the term of this patent is extended or adjusted under 35 U.S.C. 154(b) by 837 days.

This patent is subject to a terminal disclaimer.

(21) Appl. No.: 17/723,128

(22) Filed: Apr. 18, 2022

(65) Prior Publication Data

US 2022/0236169 A1     Jul. 28, 2022

Related U.S. Application Data

(63) Continuation-in-part of application No. 15/311,216, filed as application No. PCT/US2015/031366 on May 18, 2015, now Pat. No. 11,307,194.

(60) Provisional application No. 62/000,130, filed on May 19, 2014.

(51) Int. Cl.
| | |
|---|---|
| *B01L 3/00* | (2006.01) |
| *A61B 5/1455* | (2006.01) |
| *G01N 1/40* | (2006.01) |
| *G01N 21/31* | (2006.01) |
| *G02B 6/36* | (2006.01) |

(52) U.S. Cl.
CPC ........ *G01N 21/31* (2013.01); *B01L 3/502715* (2013.01); *B01L 3/502753* (2013.01); *G01N 1/4005* (2013.01); *B01L 2300/0654* (2013.01); *B01L 2300/0681* (2013.01); *G01N 2201/08* (2013.01)

(58) Field of Classification Search
None
See application file for complete search history.

(56) References Cited

U.S. PATENT DOCUMENTS

| | | | |
|---|---|---|---|
| 4,892,383 | A | 1/1990 | Klainer |
| 4,925,268 | A | 5/1990 | Yer |
| 5,059,790 | A | 10/1991 | Klainer |

(Continued)

FOREIGN PATENT DOCUMENTS

| | | |
|---|---|---|
| EP | 2281186 A2 | 2/2011 |

OTHER PUBLICATIONS

Archibong, et al., "Optofluidic spectroscopy integrated on optical fiber platform", Sensing and Bio-Sensing Research 3, 2015.

(Continued)

*Primary Examiner* — Neil N Turk
(74) *Attorney, Agent, or Firm* — Quarles & Brady LLP; Yakov S. Sidorin

(57) ABSTRACT

An optical spectroscopy probe including an optical fiber having a distal tip and a microfluidic filtering chamber attached to the distal tip of the optical fiber, the chamber comprising a microfluidic membrane configured to enable liquid to enter the chamber but prevent particles from entering the chamber. Method for fabrication of same.

18 Claims, 9 Drawing Sheets

(56) References Cited

U.S. PATENT DOCUMENTS

| | | | |
|---|---|---|---|
| 5,127,406 | A | 7/1992 | Yamaguchi |
| 5,246,862 | A | 9/1993 | Grey |
| 5,344,418 | A | 9/1994 | Ghaffari |
| 5,701,181 | A | 12/1997 | Boiarski |
| 6,157,442 | A | 12/2000 | Raskas |
| 6,256,522 | B1 | 7/2001 | Schultz |
| 6,277,330 | B1 * | 8/2001 | Liu ..................... G01N 21/552 |
| | | | 422/82.05 |
| 6,411,907 | B1 | 6/2002 | Lu |
| 6,488,891 | B2 | 12/2002 | Mason |
| 6,711,423 | B2 | 3/2004 | Colvin |
| 7,155,076 | B2 | 12/2006 | Letant |
| 7,713,733 | B2 | 5/2010 | Cliffel |
| 7,790,464 | B2 | 9/2010 | Tarasev |
| 7,792,561 | B2 | 9/2010 | Alarcon |
| 7,821,620 | B2 | 10/2010 | Dogariu |
| 9,821,309 | B2 | 11/2017 | Esch |
| 2003/0003587 | A1 | 1/2003 | Murray |
| 2007/0038124 | A1 | 2/2007 | Fulghum |
| 2011/0097755 | A1 | 4/2011 | Nomura |

OTHER PUBLICATIONS

Gulari, et al., "A compact, optofluidic system for measuring red blood cell concentration", The 17th International Conference on Transducers and Eurosensors XXVII, 2013.

M. E. H. Ong, Y. H. Chan, and C. S. Lim, "Reducing blood sample hemolysis at a tertiary hospital emergency department," The American journal of medicine, vol. 122, pp. 1054. e1-1054. e6, 2009.

M. Stauss, B. Sherman, L. Pugh, D. Parone, K. Looby-Rodriguez, A. Bell, and C.-R. Reed, "Hemolysis of Coagulation Specimens: A Comparative Study of Intravenous Draw Methods," Journal of Emergency Nursing, vol. 38, pp. 15-21, 2012.

G. Lippi, M. Plebani, A.-M. Simundic, C. Malliuzi, M. M. Muller, 0. Sonntag, L. Sciacovelli, S. Secchiero, and L. Zardo, "Special issue: Quality in laboratory diagnostics: from theory to practice," Biochemia Medica, vol. 20, pp. 126-130, 2010.

R. N. Makroo, V. Raina, A. Bhatia, R. Gupta, A. Majid, U. K. Thakur, and N. L. Rosamma, "Evaluation of Red Cell Hemolysis in Packed Red Cells During Processing and Storage," Apollo Medicine, vol. 7, pp. 35-38, 2010.

McGrath, J. K, Rankin, P., & Schendel, M. (2012). Let the Data speak: Decreasing Hemolysis Rate Through Education, Practice, and Disclouse. Journal of Emergency Nursing (3), 239. doi:10.1016/j.jen.2011.01.015.

N. J. Heyer, J_ H. Derzon, L. Winges, C. Shaw, D. Mass, S. R. Snyder, p. Epner, J. H. Nichols, J. A. Gayken, D. Ernst, and E. B. Liebow, "Effectiveness of practices to reduce blood sample hemolysis in EDs: A laboratory medicine best practices systematic review and meta-analysis," Clinical Biochemistry, vol. 45, pp. 1012-1032, 2012.

B.A. Jones, R.R. Galam & P.J. Howanitz, Arch Pathology laboratory Medicine, 1997,121, 19-26.

World Health Organization (WHO). World Health report 205: Make Every Mother and Child Count. Geneva: WHO; 2005, p. 63.

E. Ciantar and J.J. Walker, "Pre-eclampsia, severe pre-eclampsia and hemolysis, elevated liver enzymes and low platelets syndrome: what is new?," Women's Health, vol. 7, pp. 555-569, 2011.

E. V. Kuklina, C. Ayala, and W. M. Callaghan, "Hypertensive disorders and severe obstetric morbidity in the United States," Obstetrics & Gynecology, vol. 113, pp. 1299-1306, 2009.

B.E. Jones, "Optical fibre sensors and systems for industry," Journal of Physics E: Scientific Instruments, vol. 18, p. 770, 1985.

Vandelinder, V., & Groisman, A. (2006). Separation of Plasma from Whole Human Blood in a Continuous Cross-Flow in a Molded Microfluidic Device. Analytical Chemistry, 78(11), 3765-3771. doi: 10.1021/ac060042r.

A. Liu, L. Liao, D. Rubin, H. Nguyen, B. Ciftcioglu, Y. Chetrit, N. Izhaky, and M. Paniccia, "High-speed optical Modulation based on carrier depletion in a silicon waveguide," Opt. Express, vol. 15, pp.

660-668, 2007, J. Hecht and L. Long, Understanding fiber optics vol. 3: Prentice Hall Upper Saddle River, NJ, 2002.

J. S. Mckenzie and C. Clark, "High sensitivity micromachined optical-to-fluid pressure converter for use in an optical actuation scheme," Journal of Micromechanics and Microengineering, vol. 2, p. 245, 1992.

V. Fairbanks, S. Ziesmer, and P. O'Brien, "Methods for measuring plasma hemoglobin in micromolar concentration compared," Clinical chemistry, vol. 38, pp. 132-140, 1992.

Crowley, T. A., & Pizziconi, V. (2005). Isolation of plasma from whole blood using planar microfilters for lab-on-a-chip applications. Lab on a Chip, 5(9), 922-929. doi: 10.1039/B502930A.

S. Gonchukov, Y. B. Lazarev, and A. Podkolzin, "Laser Refractometry of Biological Media," Laser Physics-Lawrence-, vol. 9, pp. 344-347, 1999.

Y. L. Jin, J. Y. Chen, L. Xu, and P. N. Wang, "Refractive index measurement for biomaterial samples by total internal reflection," Physics in Medicine and Biology, vol. 51, p. N371, 2006.

M. Zolkapi, A. Zoolfakar, A. Manut, S. Taniselass, and P. Poopalan, "Design and fabrication of microfluidic transistor on silicon substrate," in Micro and Nanoelectronics {RSM), 2011 IEEE Regional Symposium on, 2011, pp. 96-99.

S. J. Li, C. Shen, and P. M. Sarro, "A Buried Vertical Filter for Micro and Nanoparticle Filtration," Procedia Engineering, vol. 25, pp. 1193-1196, 2011.

H. K. Lin, S. Zheng, A. J. Williams, M. Balic, S. Groshen, H. I. Scher, M. Fleisher, W. Stadler, R. H. Datar, Y. C. Tai, and R. J. Cote, "Portable filter-based microdevice for detection and characterization of circulating tumor cells," Clin Cancer Res, vol. 16, pp. 5011-5018, Oct. 15, 2010.

Y. Ishii, R. Kaminose, and M. Fukuda, "Optical waveguiding in an electrospun polymer nanofiber," Journal of Physics: Conference Series, vol. 433, p. 012006, 2013.

B. Kim, S. J. Cho, T. An, H. Ryu, H. Lim, and G. Lim, "Optical switching patterns using electrospun nanofiber array," physica status solidi {RRL)—Rapid Research Letters, vol. 6, pp. 409-411, 2012.

C. Van Rijn, M. Van Der Wekken, W. Nijdam, and M. Elwenspoek, "Deflection and maximum load of microfiltration membrane sieves made with silicon micromachining," Microelectromechanical Systems, Journal of, vol. 6, pp. 48-54, 1997.

J. Wang, E. S. Wong, J. C. Whitley, J. Li, J. M. Stringer, K. R. Short, M. B. Renfree, K. Belov, and B. G. Cocks, Ancient antimicrobial peptides kill anlibiotic-resistant pathogens: Australian mammals provide new options, PLoS One, vol. 6, p. e24030, 2011.

K. Reddy, R. Yedery, and C. Aranha, "Antimicrobial peptides: premises and promises," International journal of antimicrobial agents, vol. 24, pp. 536-547, 2004.

A. Izadpanah and R. L. Gallo, "Antimicrobial peptides," Journal of the American Academy of Dermatology, vol. 52, pp. 381-390, 2005.

R. Bals and J. Wilson, "Cathelicidins-a family of multifunctional antimicrobial peptides," Cellular and Molecular Life Sciences CMLS, vol. 60, pp. 711-720, 2003.

H. Zhu and M. Snyder, "Protein chip technology," Current Opinion in Chemical Biology, vol. 7, pp. 55-63, 2003.

L. Baldini, A. J. Wilson, J. Hong, and A. D. Hamilton, "Pattern-based detection of different proteins using an array of fuorescent protein surface receptors," Journal of the American Chemical Society, vol. 126, pp. 5656-5657, 2004.

M. S. Bronze and R. A. Greenfield, "Preventive and therapeutic approaches to viral agents of bioterrorism," Drug discovery today, vol. 8, pp. 740-745, 2003.

N. A. Rakow and K. S. Suslick, "A colorimetric sensor array for odour visualization," Nature, vol. 406, pp. 710-713, 2000.

B. J. While, "Porphyrins as colorimetric indicators for detection and identification of chemical and biological agents," Oklahoma State University, 2004.

L. Tomasinsig and M. Zanetti, "The cathelicidins-structure, function and evolution," Current Protein and Peptide Science, vol. 6, p. 23 34, 2005.

H. J. Harmon, "Specific visible spectral changes induced by guanine binding to cytosine-derivatized porphyrin," Journal of Porphyrins and Phthalocyanines, vol. 6, pp. 73-77, 2002.

(56)        References Cited

OTHER PUBLICATIONS

C. Malitesta, I. Losito, and P. G. Zambonin, "Molecularly Imprinted Electrosynthesized Polymers: New Materials for Biomimetic Sensors," Analytical Chemistry, vol. 71, pp. 1366-1370, Apr. 1, 1999 1999.

M. Takahaski, A. Ueno, T. Uda, and H. Mihara, "Design of novel porphyrin-binding peptides based on antibody CDR," Bioorganic & Medicinal Chemistry Letters, vol. 8, pp. 2023-2026, 1998.

R. K. Jain and A. D. Hamilton, "Protein surface recognition by synthetic receptors based on a tetraphenylporphyrin scaffold," Organic letters, vol. 2, pp. 1721-1723, 2000.

J. R. Deschamps, P. T. Charles, A. P. Malanoski, B. J. Johnson, B. J. Melde, N. E. Anderson, and M. Nasir, "Porphyrin-Embedded Silicate Materials for Detection of Hydrocarbon Solvents," ed: Naval Research Lab Washington DC Center for Biomolecular Science and Engineering, 2011.

B. Johnson-While, M. Zeinali, K. M. Shaffer, C. H. Patterson Jr, P. T. Charles, and M.A. Markowitz, "Detection of oganics using porphyrin embedded nanoporous organosilicas," Biosensors and Bioelectronics, vol. 22, pp. 1154-1162, 2007.

J. A. Legako, B. J. While, and H. J. Harmon, "Detection of cyanide using immobilized porphyrin and myoglobin surfaces," Sensors and Actuators B: Chemical, vol. 91, pp. 128-132, 2003.

* cited by examiner

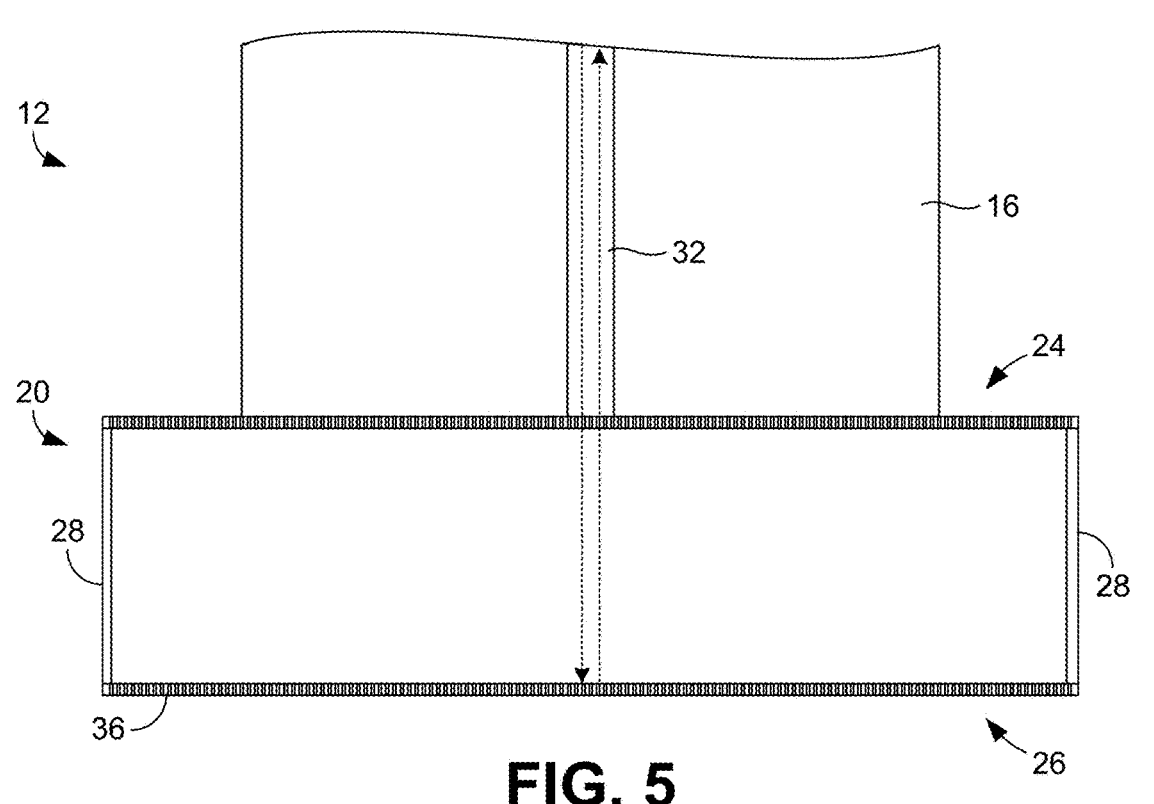
FIG. 5
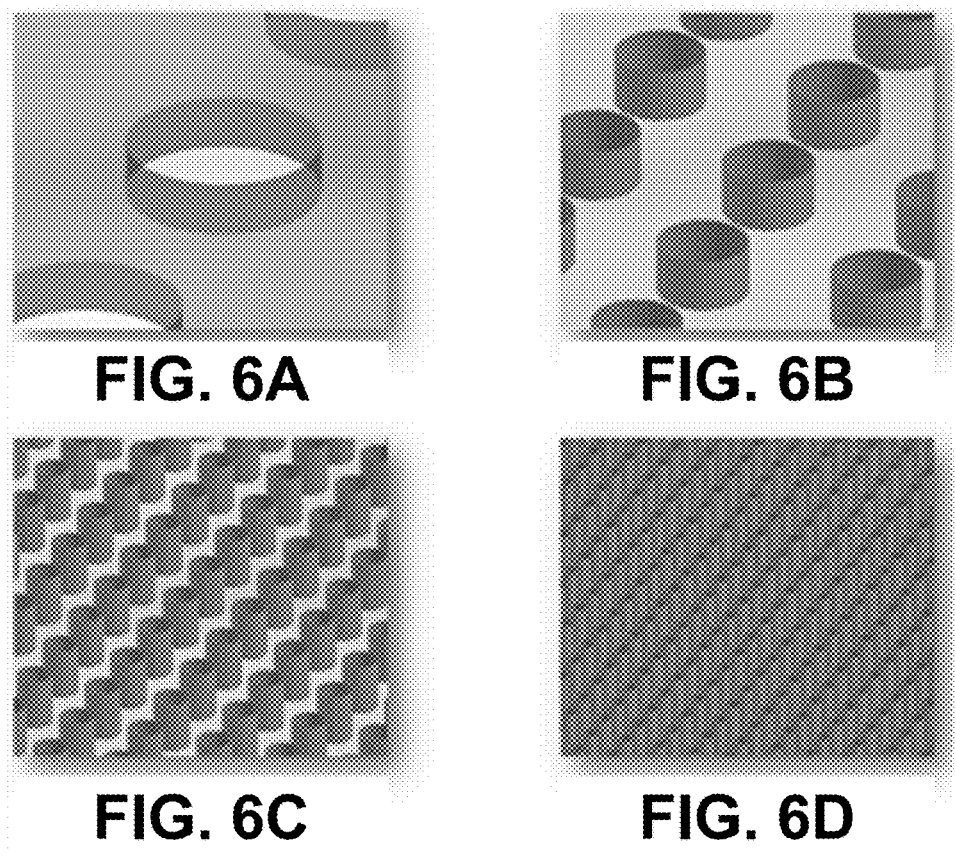
FIG. 6A        FIG. 6B
FIG. 6C        FIG. 6D

1 μm pores

2 μm pores

5 μm pores

10 μm pores

Wavelength, nm

SYSTEMS AND METHODS FOR ANALYZING LIQUIDS

CROSS-REFERENCE TO RELATED APPLICATIONS

This application is a continuation-in-part from the pending U.S. patent application Ser. No. 15/311,216, filed Nov. 15, 2016, now published as US 2017/0082602, which is a national stage filing under 35 U.S.C. § 371 of International Application No. PCT/US2015/031366, filed May 18, 2015, which claims priority from U.S. Provisional Application No. 62/000,130, filed May 19, 2014. The disclosure of each of the above-identified patent documents is incorporated by reference herein.

BACKGROUND

Analysis of a liquid to determine the makeup of its contents is desirable in various situations. One example is provided by hemolysis detection. Hemolysis is the disruption of red blood cells and release of hemoglobin and other intercellular components into the blood plasma. Hundreds of millions of blood tests are performed annually in the United States, and a significant number of these tests are compromised because of in vitro hemolysis. Unfortunately, there is currently no reliable way to detect hemolysis without plasma separation. Therefore, significant delays are introduced that negatively affect treatment and diagnosis of the patients. If early signs of in vivo hemolysis could be detected, it would significantly improve the outcome for many patients, including pregnant women affected by HELLP syndrome, which is characterized by hemolysis, elevated liver enzymes, and low platelet count.

Another situation in which it may be desirable to analyze a liquid is drug identification. Drug administration errors account for approximately 32% of preventable medical errors that result in morbidity or mortality. While there are several specialized assay-based techniques have been used to monitor medication errors in specific therapeutic treatments, these techniques have several limitations that prevent them from being used for point-of-care sensing. The techniques are time consuming and often require large volumes of analyte to achieve the needed sensitivity. Furthermore, drug assays use complicated electrochemical measurements, suffer from background interference in complex solutions, and have poor thermal stability.

In view of the above discussion, it can be appreciated that there is a critical need for a system and method that enables real-time, point-of-care analysis of liquids.

SUMMARY

Embodiments of the invention provide an optical spectroscopy probe that includes a microfluidic filtering chamber (having an inner volume defined by sidewalls formed in at least one first material having a first etch rate and first and second thin-film layers made of at least one second material having a second etch rate and forming a top and a bottom of the chamber) and an optical fiber having a distal tip. The second etch rate is lower than the first etch rate; the sidewalls and the thin-film layers enclose a hollow inner space of the chamber configured to receive a fluid to be analyzed with such probe; at least one of the first and second thin-film layers contains a plurality of pores than allow the fluid to enter the hollow inner space but prevent particles larger than the pores from entering the hollow inner space; and a facet of the optical fiber is disposed in proximity to a proximal thin-film layer of said first and second thin-film layers while a distal thin-film layer of said first and second thin-film layers is separated from the facet by at least a portion of the inner volume of the chamber.

Embodiments of the invention also provide an optical spectroscopy probe that includes an optical fiber having a distal tip and a microfluidic filtering chamber. The chamber is formed and defined by one or more side walls made of a first material having a first etch rate, a proximal thin-film layer that is cooperated with the distal tip of the fiber and that is made of a second material having a second etch rate that is lower than the first etch rate, and a distal thin-film layer made of the second material. (Here, one or more side walls extend between and are limited in extent by the proximal thin-film layer and the distal thin-film layer). The proximal thin-film layer, distal thin-film layer, and one or more side walls define and enclose a hollow inner space of the chamber configured to receive a fluid to be analyzed, while the proximal thin-film layer has an opening in which the distal tip of the optical fiber is received. At least one of the proximal thin-film layer, the distal thin-film layer, and the one or more side walls comprises a plurality of pores that are dimensioned to allow the fluid to enter the hollow inner space but prevent particles larger than the pores from entering the hollow inner space.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 5 is a schematic side view of the optical spectroscopy probe of FIG. 2, illustrating reflection of light emitted from an optical fiber of the probe.

FIGS. 6A, 6B, 6C, and 6D are renderings of microfluidic membranes having various pore sizes.

DETAILED DESCRIPTION

Figure 1:
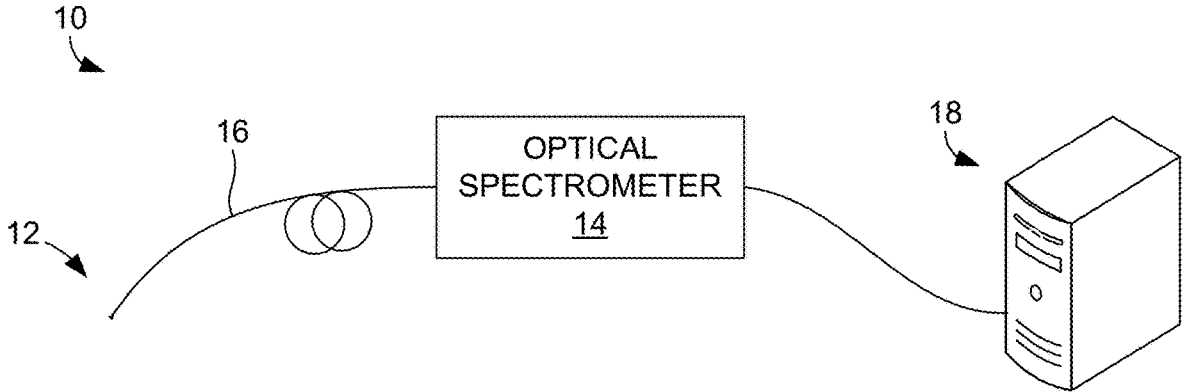
FIG. 1 is a schematic diagram of an embodiment of a system for analyzing liquids.

As described above, there is a critical need for a system and method that enables real-time, point-of-care analysis of liquids. For the purposes of this disclosure and accompanying claims, a real-time performance of a system is understood as performance which is subject to operational deadlines from a given event to a system's response to that event. For example, a real-time use of information representing reflectivity of a given object (such as a piece of material, for example) collected in a buffer or data storage associated with an optical detection system may be one triggered by the user or microprocessor and executed simultaneously with and without interruption of a process of illumination or irradiation of the object during which such information is being or has been acquired and recorded.

The practical inability of the methodologies of related art to characterize fluid, containing particles or components suspended in such liquid (whether contaminants or other free-floating particles; hereinafter interchangeably referred to and defined as insolubles) is solved by devising an optical spectroscopic probe that includes a microfluidic filtering chamber operably connected with an optical fiber delivering light at and to a volume of the chamber. The filtering chamber is configured to filter out the free-floating components within the fluid that could otherwise skew the results of the analysis of the liquid itself, when immersed in the liquid. (The fluid can, for example, be a biological fluid, such as blood, or a fluid that is to be administered to a patient, such as intravenous fluid, or in a specific case the fluid can be represented by a gaseous substance containing free-floating particles) Regardless, the chamber separates free-floating particles in the fluid from the remainder of the fluid to enable absorption spectroscopy to be performed on the fluid.

One practical application for the disclosed embodiments of the systems and methods may be to replace traditional hemolysis testing of blood samples, which requires larges volume of blood to be collected, centrifugation, and bulk instrumentation, with a single setup that can work nearly instantaneously, in real-time. A miniature, near-patient sensor for the detection of hemolysis will enhance patient diagnosis, treatments, costs, satisfaction, and experience. Another practical application of the embodiments of the invention may be to overcome the limitations of drug identification testing by providing a new platform that can be used to detect concentrations of drugs within a liquid with the use of absorption spectroscopy, free from noise caused by particles and cells, and without prior sample pre-processing. These and other goals can be achieved with use of an optical spectroscopy system that comprises an optical spectroscopy probe configured to be directly insertable into a fluid (in some non-limiting examples—blood, in vivo or in vitro, or a solution that is to be administered to a patient).

Embodiment(s) of the Invention

FIG. 1 provides a schematic illustration of an embodiment of the invention. As shown, the embodiment of the system 10 generally includes an optical spectroscopy probe 12 that is coupled to an optical spectrometer 14 configured to detect the intensity of absorbed light as a function of wavelength or optical frequency. The probe 12 includes an optical fiber 16 and a microfluidic filtering chamber (not shown in FIG. 1) at a distal end of the fiber 16. The optical spectrometer 14 is connected to a computing device or processor 18 configured to execute appropriately structured program codes to perform analysis on the light detected by the spectrometer 14 and output reports (in one specific case—visually-perceivable indicia) representing the results of such analysis.

Figure 2:
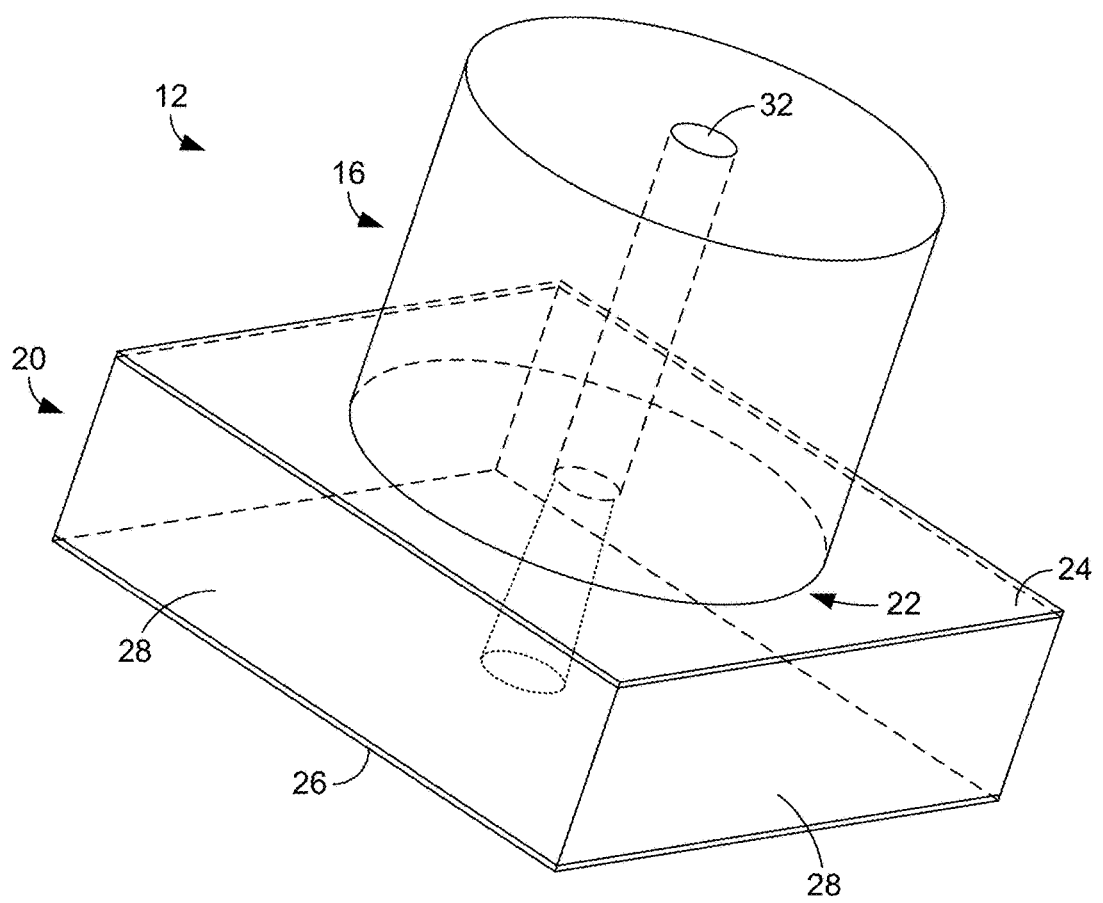
FIG. 2 is a partial perspective view of an embodiment of an optical spectroscopy probe that can be used in the system of FIG. 1.

FIG. 2 provides a schematic example of a structure of an embodiment of the probe 12. As shown, the probe 12 incorporates the optical fiber 16 identified in FIG. 1 with a microfluidic filtering chamber 20 that is attached to a cleaved distal tip of end 22 of the fiber.

As shown in FIG. 2, the microfluidic chamber 20 is generally configured as a volume that is defined and limited by a proximal (or top, or upper) wall or surface 24, a distal (or bottom, or lower) wall or surface 26, and a side wall or surface (in the case of such side wall having no surfaces forming a dihedral angle with one another) or multiple side walls, as shown) 28. Since the formation/manufacture of the chamber 20 is preferably carried out using the method of photolithography (see the example of FIGS. 8A through 8E below), a skilled artisan will readily appreciate that the volume defined by the chamber 20 may typically be bound by a wall or walls or surfaces that are monotonic and continuous in nature and, optionally, are substantially devoid of spatial discontinuities. Just for simplicity of illustration—and not for the purposes of identification or definition or limitation of the scope—the shell containing the volume of the chamber 20 is shown in FIG. 2 as a generally polyhedron-like box-type structure.

Referring again to FIG. 2, and depending on the specifics of a particular implementation, the side wall(s) 28 can be made of any first material lending itself for use as a substrate material in an optical lithographic process (including but not limited to at least one of semiconductor materials—whether substantially pure or doped—such as group IV elemental semiconductors such as C, Si, Ge, Sn; group IV compound semiconductors, group VI elemental semiconductors such as S, Se, Te; III-V semiconductors; II-VI semiconductors; I-VII semiconductors; IV-VI semiconductors; V-VI semiconductors; II-V semiconductors; I-III-VI$_2$ semiconductors; layered semiconductors; magnetic semiconductors; organic semiconductors; and the so-called metalloids, to name just a few). The upper and/or lower walls 24, 26 (depending on the specifics of the particular implementation) are preferably but not necessarily are formed from a second material (or combination of second materials) that are etch-resistant (whether in dry/plasma etching or wet/chemical etching processes) and thereby lend themselves to be a "masking" material on a wafer or substrate composed of the first material, as known in the art. The list of such second materials includes but is not limited to silicon nitride, AlN, ScAlN (the description of which is available at avs.scitation.org/doi/10.1116/1.4994841), materials known as hard oxides (SiO$_2$, various oxides of Ti, Al$_3$O$_3$, Cr$_2$O$_3$ to name just a few), and various metals (such as Cr, in one instance). For practically successful fabrication of the chamber 20, the first material should have a higher etch rate than that of the second material.

Figure 4:
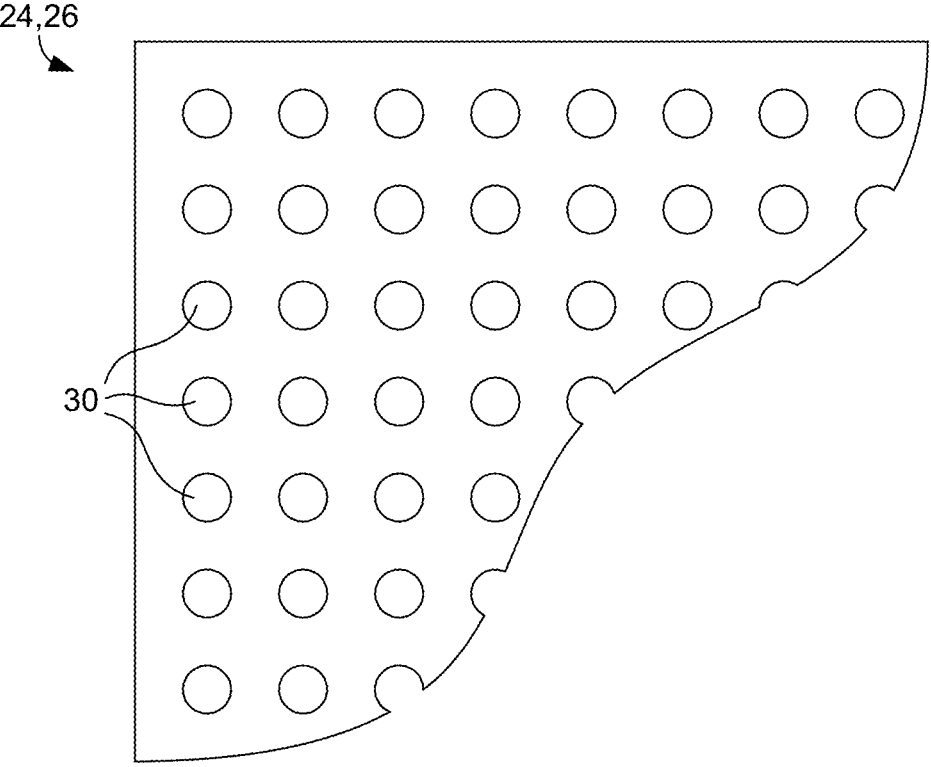
FIG. 4 is a partial plan view of a wall of the microfluidic filtering chamber of FIG. 3.

For the purposes of one non-limiting example only, the side surface(s) 28 can be formed in a silicon substrate to be approximately 100 to 1,000 μm in height and approximately 10 to 500 μm thick. The proximal wall or surface 24 and the distal wall or surface 26 can be made, for example, of silicon nitride (Si$_3$N$_4$) and can be approximately 0.3 to 3 μm thick and have length and width dimensions of approximately 100 to 3,000 µm. The distal wall 26, and optionally the proximal wall 24, is judiciously perforated so as to have a plurality of pores or openings therethrough that form a microfluidic filter or membrane through which the fluid at hand can flow or penetrate, but particles/insoluble that are larger than these pores cannot, thereby implementing a filtering function. As a result, once the chamber 20 is immersed into the fluid, it substantially keeps out all of the insolubles with predetermined sizes outside of the volume of the chamber, while allowing the fluid to fill the volume of the chamber 20. FIG. 4 schematically illustrates a partial detail view of one of the walls 24, 26. The pores/openings 30 can be generally shaped substantially arbitrarily and be located at the wall 24, 26 substantially randomly. In one case, however—as shown— the openings may have a regular shape (circular, for example) and be spaced from one another in a pre-determined fashion such as to form a pre-defined pattern (as shown, the openings are spaced equidistantly from each other across the plane of the wall 24, 26). In some embodiments, the pores 30 are approximately 1 to 10 µm in dimension across (diameter, width).

Figure 7:
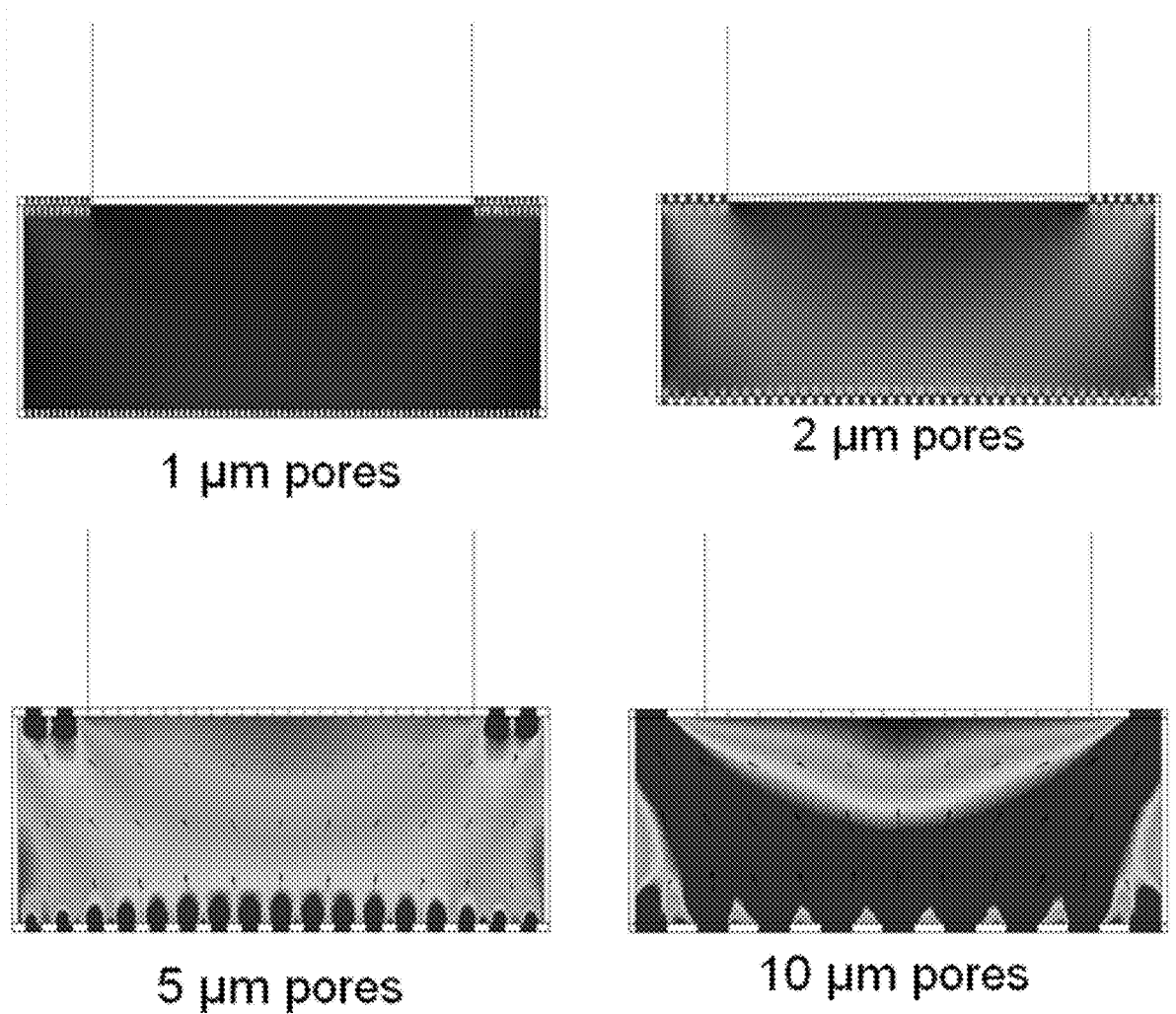
FIG. 7 includes graphs of the velocity and vector fields inside microfluidic chambers having various pore sizes.

SolidWorks™ was used to evaluate possible practical perforation configurations (that is, spatial patterns of openings 30 across the walls 24, 26) considering the situation in which such openings have substantially cylindrical shapes. FIGS. 6A, 6B, 6C, and 6D present SolidWorks™ renderings of microfluidic membranes having pore sizes of 1, 2, 5, and 10 µm. The optimal pore size that may allow sufficient fluid flow such as whole blood inside the device was determined using only minimum external pressure as the driving force. The goal was to determine the smallest optimal pore size that would provide substantial fluid through the membrane formed by the walls 24 and/or 26 while at the same time impeding access of the relatively large insoluble particles to the volume inside the chamber. The fluid simulation was iterated until the bulk average velocity reached steady state. The study showed that, when the membranes have a pore size smaller than 1 µm, the flow velocity through the membrane(s) is negligible without driving the liquid through the membrane with elevated pressure. Reasonable flow can be achieved starting from 2 µm pores with the speed of flow significantly increasing for 5 and 10 µm (see FIG. 7). In view of these findings, for applications in which no driving force is provided, the optimal pore size may be around 2 µm. For smaller pore sizes, additional pressure may need to be applied. Of course, the optimal pore size may also be dependent upon the viscosity of the fluid.

The optical fiber 16 is preferably a multimode optical fiber or even a lightpipe without any requirement to be an optical waveguide as understood in related art (although an optical waveguide can be used in one implementation); in one example it can be approximately 100 to 400 µm in diameter and have a core 32 that is approximately 8 to 50 µm or larger in diameter.

Figure 3:
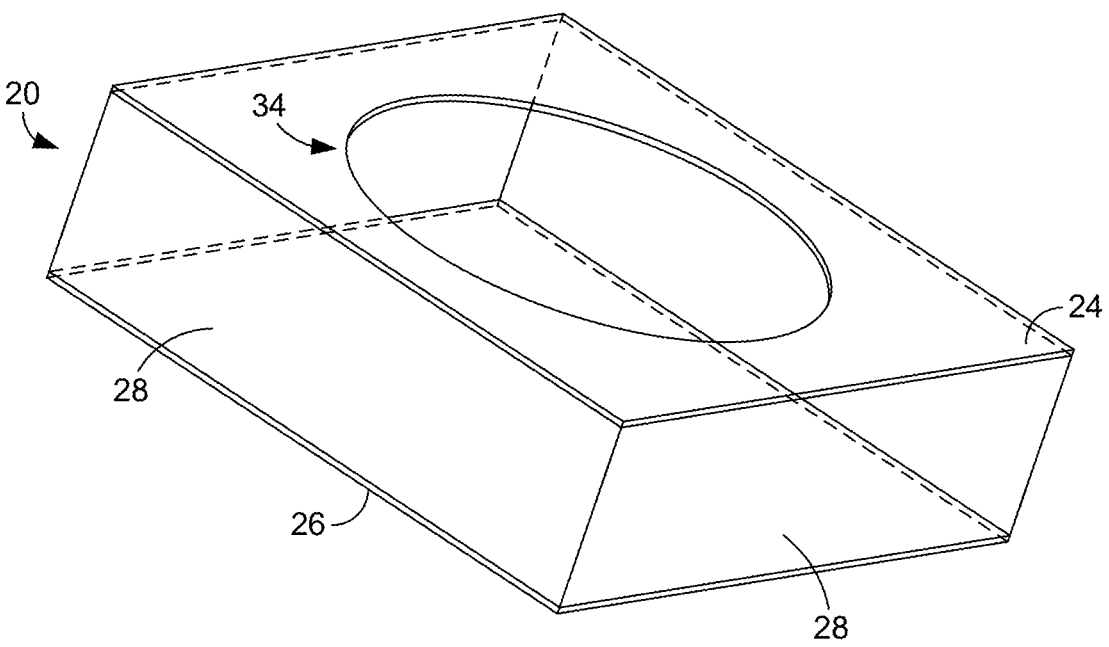
FIG. 3 is a perspective view of a microfluidic filtering chamber of the optical spectroscopy probe of FIG. 2.

As shown in FIG. 3, which depicts the microfluidic filtering chamber 20 separate from the optical fiber 16, the proximal wall (upper surface) 24 of the chamber 20 can have an opening or aperture 34 that is appropriately sized and configured to receive the distal tip 22 of the fiber. This opening 34 can also have a diameter of approximately 100 to 400 µm. Generally, the attachment between the distal tip or end 22 and the chamber 20 can be facilitated by such opening or aperture at the upper (top) surface or wall 24 of the chamber 20, through which the distal end 22 is inserted into the volume of the chamber while the outer surface of the fiber 16 is fixated with respect to the chamber 20 in one of multiple available fashions (for example, with an adhesive).

Alternatively, the spatial coordination between the cleaved output fiber facet at the distal end 22 can be arranged such that the out facet of the fiber positioned substantially flush with the upper surface 24, for the output of light (delivered to the distal end 22 from the proximal end of the fiber 16) to penetrate through the aperture in the upper surface 24 into the chamber substantially un-attenuated. Alternatively, the cleaved facet of the fiber can be appropriately affixed outside of the chamber 20 such that there is a pre-determined space between the cleaved facet and the outer surface of the wall 24 (provided the distal end is appropriately affixed to the chamber). In this two latter cases, there is no need to have the aperture 34 dimensioned to accommodate the outer diameter of the fiber 16 but it is sufficient for the aperture 34 to have a diameter that is appropriately larger than a diameter of the core 32 of the fiber 16. FIG. 3 does not indicate the presence of the openings/pores 30 for simplicity of illustration.

The distal wall 26 of the chamber can be made reflective to radiation delivered through the fiber 16 to enable spectroscopic measurement of the fluid under evaluation in the volume of the chamber 20. In some embodiments, the outer surface 36 of the distal wall 26 may be additionally coated with a reflective material, such as a reflective metal (see FIG. 5).

As was already alluded to, during use, the microfluidic filtering chamber 12 is employed to locally separate free-floating particles from fluid of interest, which is collected inside the chamber. For example, if the fluid is whole blood, the chamber 12 separates red blood cells from the blood plasma. Because the distal wall 26 is reflective, light exiting the distal end 22 of the optical fiber 16 will be reflected off of the wall 26 upon propagation to such wall through the filtered liquid, and couple back into the fiber 16, as depicted in FIG. 5, to be further delivered to the optical detection system/optical spectrometer at the proximal end of the fiber 16 Hemolysis, for example, can then be detected by measuring increased hemoglobin-related absorption in the locally filtered plasma. In some embodiments, the light used for interrogation of the fluid is chosen to have a wavelength at which such light is highly absorbed by hemoglobin (such as approximately 532 nm). Alternatively, if the fluid is one that is to be administered to a patient, the absorption of the interrogating light by the fluid can provide an indication of a drug present in the fluid and its concentration.

Figures 8A, 8B, 8C, 8D, 8E:
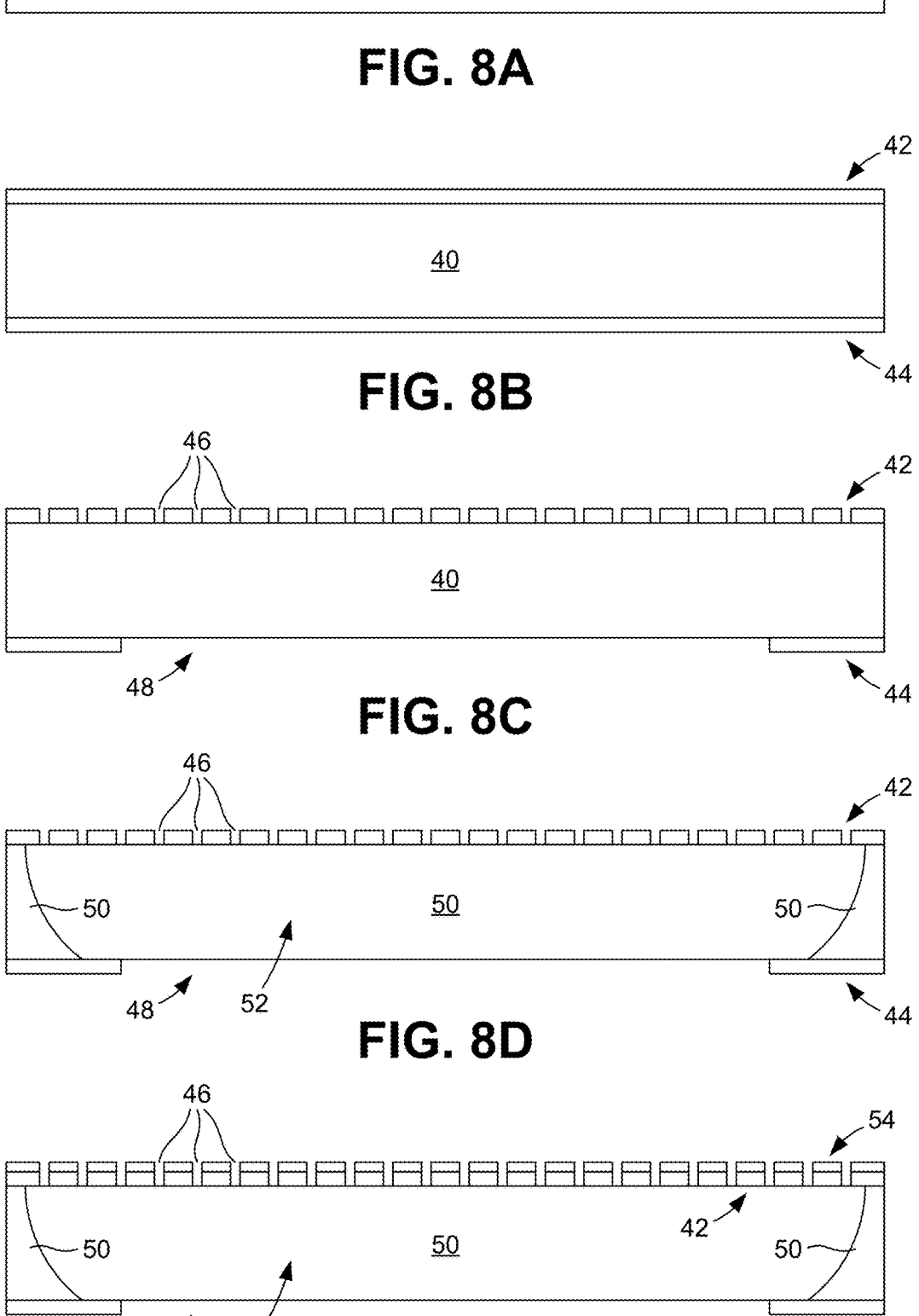
FIGS. 8A, 8B, 8C, 8D, and 8E illustrate sequential steps in an embodiment of a microfluidic filtering chamber fabrication process.

Fabrication of the Microfluidic Chamber and Verification of Operability of Same Prototype microfluidic filtering chambers were fabricated using standard micro-fabrication processes. FIGS. 8A, 8B, 8C, 8D, and 8E schematically illustrate steps of but one of possible fabrication processes, in which silicon was chosen as a substrate material (first material) and silicon nitride was chosen as a mask material (second material) Beginning with FIG. 8A, a double-sided polished silicon wafer from Nova Electronic Materials (Texas) was used as the membrane substrate 40. Referring next to FIG. 8B, a 1 µm thick layer 42, 44 of silicon nitride was grown on both sides of the substrate 40 using low stress, low pressure chemical vapor deposition (LPCVD). The coated substrate 40 was cleaned with acetone and isopropyl alcohol (IPA) and then dried with nitrogen. Additionally, the substrate 40 was baked on hotplate at 115° C. for 5 minutes to dry it. The substrate 40 was cooled for a few minutes and then spin-coated with photoresist. Next, the $Si_3N_4$ layers were patterned using ultraviolet (UV) photolithography and reactive ion etching to form pores 46 on the layer 42 (i.e., the distal wall) and an optical fiber opening 48 on the opposite layer 44 (i.e., the proximal wall), as shown in FIG. 8C. The pores 46 were 10 μm in diameter and were patterned in a square array with the distance of 15 μm from center to center. (This configuration was laser found to enable filtration of particles larger than 10 μm in diameter.)

After patterning the silicon nitride layers 42, 44, the exposed silicon was etched away in a solution of potassium hydroxide (KOH, 85° C.) for 7 hours, to create side walls 50 and a hollow inner chamber 52 enclosed by side walls and the two nitride layers 42, 44 capping such side walls and forming atop and a bottom of the future microfluidic chamber, as shown in FIG. 8D. Finally, as shown in FIG. 8E, a layer 54 of a reflective material (for example, a metal such as but not limited to gold or silver of the appropriate thickness—in one case, about 200 nm; or an optical thin-film stack judiciously designed as known in the art to increase the reflectivity of the underlying layer, could be optionally, deposited on top of at least one of the silicon nitride layers (as shown—layer 42) using, for example, a Denton Thermal Evaporator.

Figure 9:
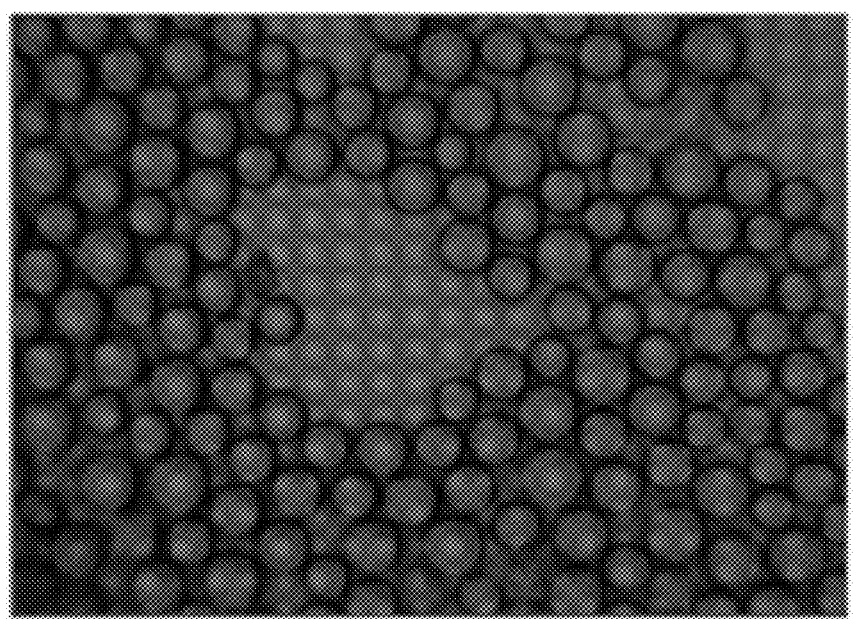
FIG. 9 is an image of a fabricated microfluidic membrane filtering particles that were larger that the pore size of the membrane.
Figure 10:
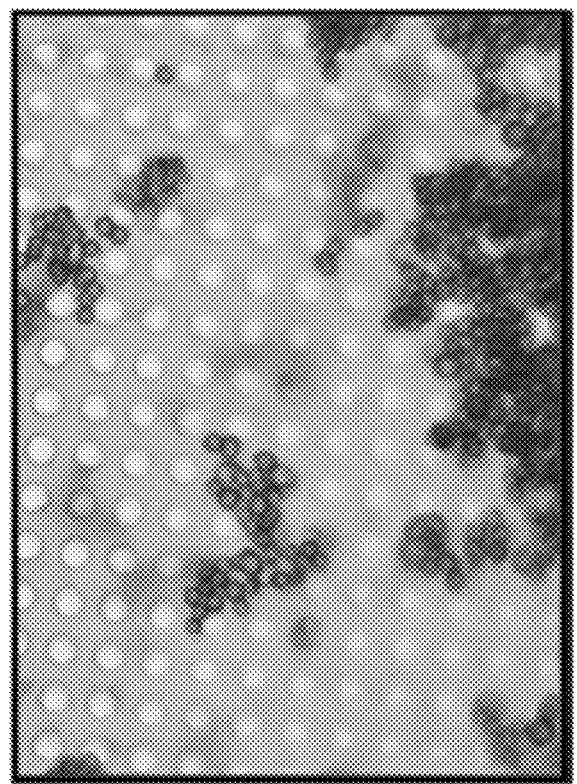
FIG. 10 is an image of small particles having passed through a fabricated microfluidic membrane having pores larger than the particles.

The filtering properties of fabricated membranes were tested using micro-particle filtration. Fluid was pumped through the membranes using a peristaltic pump with a minimum pressure of 2.14 uL/s working at this lowest setting. FIG. 9 shows particles larger than the pore size being stopped by a membrane, while FIG. 10 shows particles smaller than the pore size freely propagating through the pores (particles can be seen on both sides of the transparent membrane in FIG. 10).

After continuous testing using an initial setup with direct fluid drop on the membrane, the delay in filtering was observed due to the accumulation of large number of particles on surface of the membrane. Next, a two-head polydimethylsiloxane (PDMS) microfluidic setup was designed. It was made with a replaceable watertight seal for experiments with different flow parameters while little external pressure was provided using the peristaltic pump. Replaceable capillary tubes were used instead of molding columns for flow on the PDMS and glass slides were used to hold the setup in place.

Figure 11:
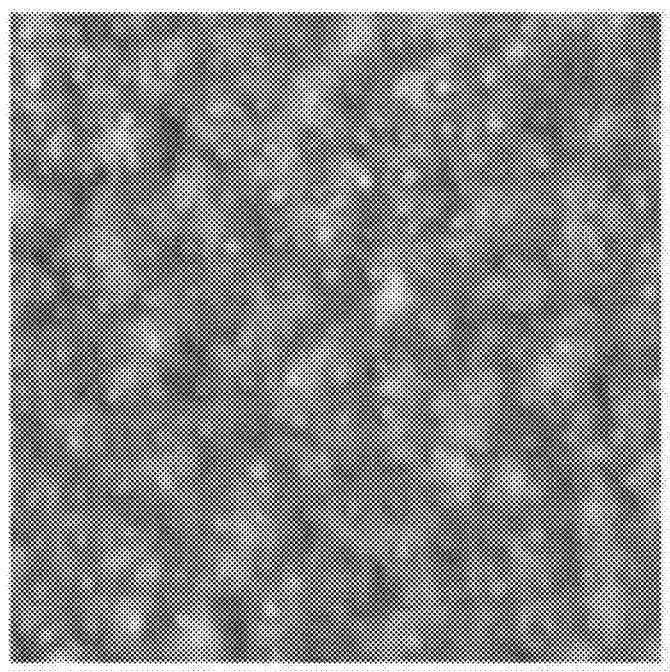
FIG. 11 is an image of cells being blocked by a fabricated microfluidic membrane having pores smaller than the cells.

Next, breast cancer cells in a cell medium were used to demonstrate cell filtering and capture. Using a confocal microscope, images of human breast cancer cell line were captured as droplets of cells in the medium were introduced to the microfluidic membrane. The Hs578t epithelial breast cancer cells, as shown in FIG. 11, are on the larger scale than normal cells and had an average size of 11 μm. The cells clustered on top of the membrane.

In further testing, fabricated membranes were positioned underneath an upright optical microscope for observation, where the membrane surfaces were oriented perpendicular to the microscope objective. The membranes were slightly elevated, allowing for space to exist beneath them. In order to observe filtration with these membranes, a droplet of deionized water containing naturally occurring contaminants (dust) was placed on top of the membrane surface. By relying on gravitational forces alone, the droplet of water was allowed to pass through the membrane, while contaminants were effectively filtered out. These effects were recorded using a microscope camera. After the filtration experiment was completed, the membranes were easily cleaned by rinsing with acetone.

Assembly of the Embodiments of the Probe

After testing the filtering properties of the membranes, fabricated microfluidic filtering chambers comprising the membranes were attached to optical fiber tips. For this, an 8 μm optical fiber was cleaved and inserted into an adjustable fiber holder to provide mechanical support to the otherwise flexible fiber. Following this, the fiber holder was inserted into a high precision XYZ-stage and the tip was positioned approximately 105 μm from a reflective metal membrane by adjusting the dial of the optical stage. Finally, the entire device was fixed in place by epoxying the metal surrounding the membranes to a small PDMS tube. This tube was created to fit tightly to the optical fiber holder.

In order to optimize coupling of light into the volume of the microfluidic chamber, the optical fiber was set substantially perpendicular to the membrane formed by the proximal (upper) wall of the chamber. Angular alignment of the system was performed by adjusting the XYZ-stage and observing the reflected power in air. An approximation of fiber angle was made qualitatively through visual observation. However, for added precision, reflected power was recorded while the fiber angle was finely tuned. The fiber angle was set once the reflected power reaches a maximum value. Following the angular alignment, the fiber had to be placed at a set spacing from the membrane surface. The XYZ-stage allows for vertical adjustment of the fiber. However, micron-level precision was needed to effectively determine the spacing, and thus Fabry-Perot resonance was used for high precision measurements. This optical resonance was formed in an optical cavity between the gold-coated membrane of the distal wall 26 and the cleaved interface/facet at the distal end 22 of the fiber. The spectrum of the optical resonance was recorded in air (refractive index: 1.0) and conducted using infrared light between 1,400 and 1,500 nm. Using the collected infrared (IR) spectrum, the distance between the surfaces of the wall 26 and the cleaved output facet of the fiber could be calculated using the following expression:

$$d = \frac{\lambda_i^2}{2n(\lambda_{i+1} - \lambda_i)} \qquad \text{(Equation 1)}$$

where $\lambda_i$ and $\lambda_{i+1}$ are consecutive resonance wavelengths (nm) and n is the refractive index. By recording resonance patterns for different vertical settings of the XYZ-stage, a correlation between stage setting and the actual distance, determined by Equation (1), was obtained. Once the appropriate vertical setting was found, the fiber was fixed in a chosen position and the distance was verified again using Fabry-Perot resonance. In one specific case, the Fabry-Perot resonance was recorded for the vertical setting once the fiber was set 105 μm from the membrane.

Demonstration of Operability of the Probe

In order to demonstrate that the microfluidic filtering chamber-based embodiment of the probe is operable to identify drugs and their concentrations, absorption spectroscopic measurement was conducted for cobalamin (vitamin $B_{12}$). Cobalamin is an essential water-soluble vitamin, of which a deficiency can lead to abnormal neurologic and psychiatric symptoms. There are a variety of doses that are used for injections, from 0.2 μg/kg for neonates and infants to 1,000 μg/kg total for adults with severe vitamin deficiency.

Figure 12:
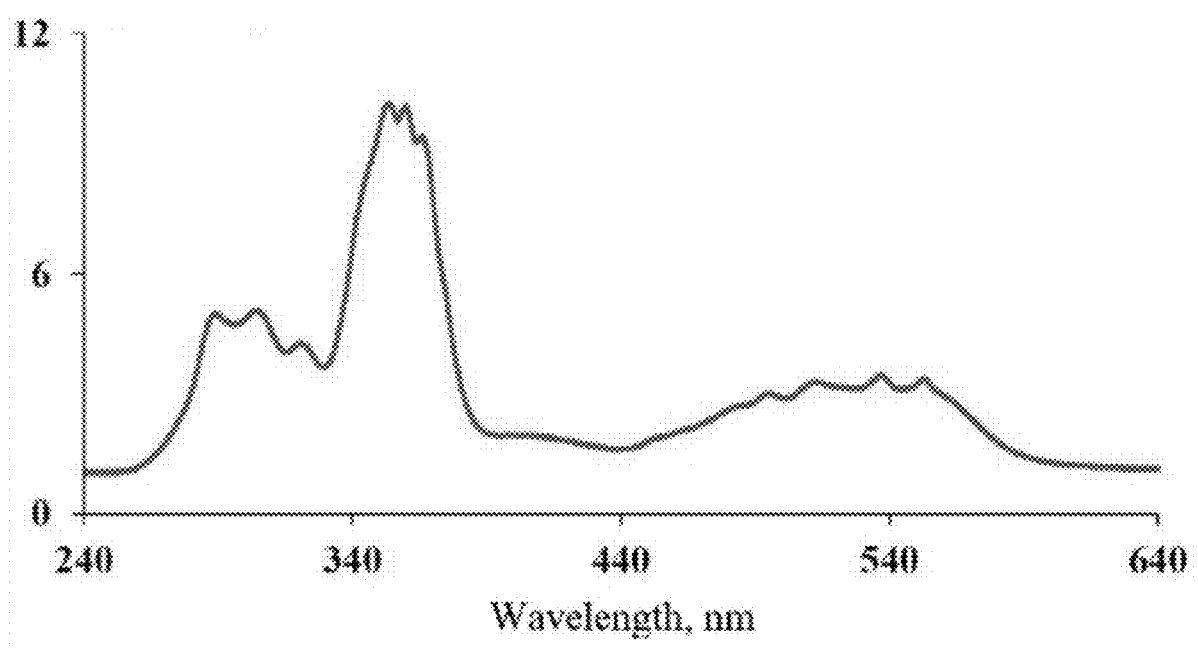
FIG. 12 is a graph that shows the theoretical absorption spectrum for cobalamin.
Figure 13:
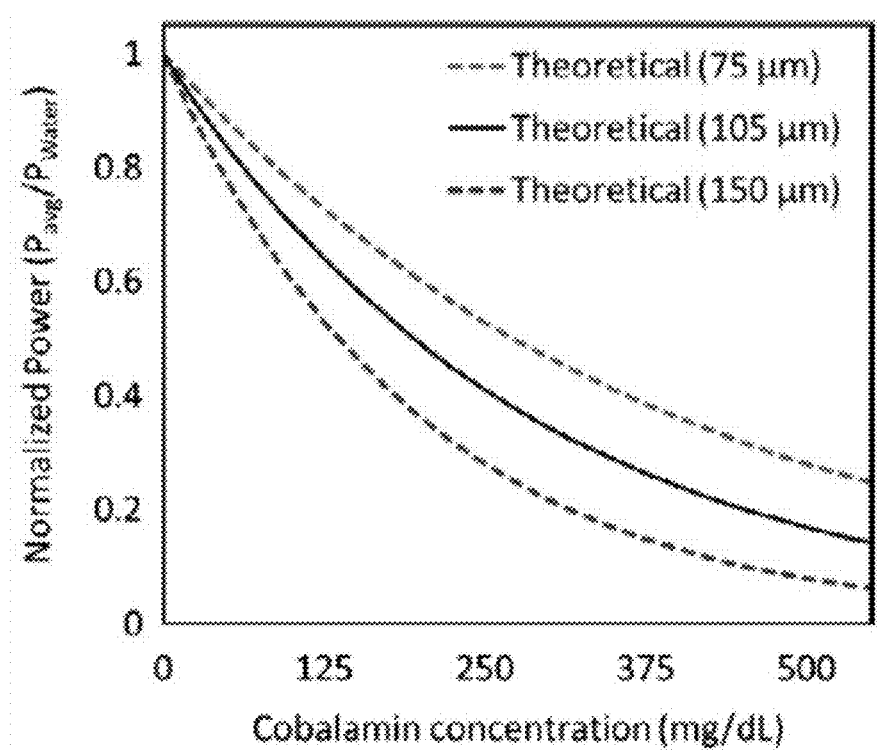
FIG. 13 is a graph illustrating the results of cobalamin measurements when an optical fiber was spaced from a reflective microfluidic membrane at distances of 75, 105, and 150 μm.

The absorption spectrum of cobalamin dissolved in water with a concentration of 60 mg/dL is shown in FIG. 12. When drug is known, its concentration can be measured at one specific wavelength, since it is much faster than measurements of the whole spectrum. The goal was to construct a sensor that would be able to conduct measurements for the broad range of concentrations from 0.1 mg/dL to 500 mg/dL. Theoretical modeling of this sensors transfer function was conducted using Beer-Lambert law:

$$\frac{P}{P_0} = \exp(-2adC) \qquad \text{(Equation 2)}$$

where P is the power of transmitted light (W) for the fluid under study, $P_o$ is the transmitted power (W) for a pure sample, $\alpha$ is the molar absorptivity with units of L/mol cm, 2d is the total optical path where d was the spacing between the fiber and reflective surface (cm), and C is the concentration of the cobalamin expressed in mol/L. FIG. 13 shows the theoretical transfer functions plotted for the needed range of concentrations with 75, 105, and 150 $\mu$m spacing between the fiber and the membrane. While the 150 $\mu$m gap is better for the measurements of lower concentrations and the 75 $\mu$m works better for higher concentrations, the 105 $\mu$m gap is suitable for both ranges and thus was chosen for the experimental testing.

During these experiments, the concentration of cobalamin was varied from approximately 0.1 to 515 mg/dL while the reflected power was recorded for each concentration. All measurements were conducted over 5 minute timeframes, during which the power was averaged. A high stability green laser (532 nm) was used at a fixed power at 30 mW. After a cobalamin measurement was made, the sample was removed, and the sensor was thoroughly rinsed with water. This cleaning was conducted to prevent build-up of cobalamin on surfaces. After cleaning, the setup was allowed to air dry for approximately 1 minute, ensuring that all water was removed from the system. Samples were tested sequentially with increasing concentration. In order to ensure reproducibility of results, every test was calibrated with respect to the water control measurements.

Figure 14:
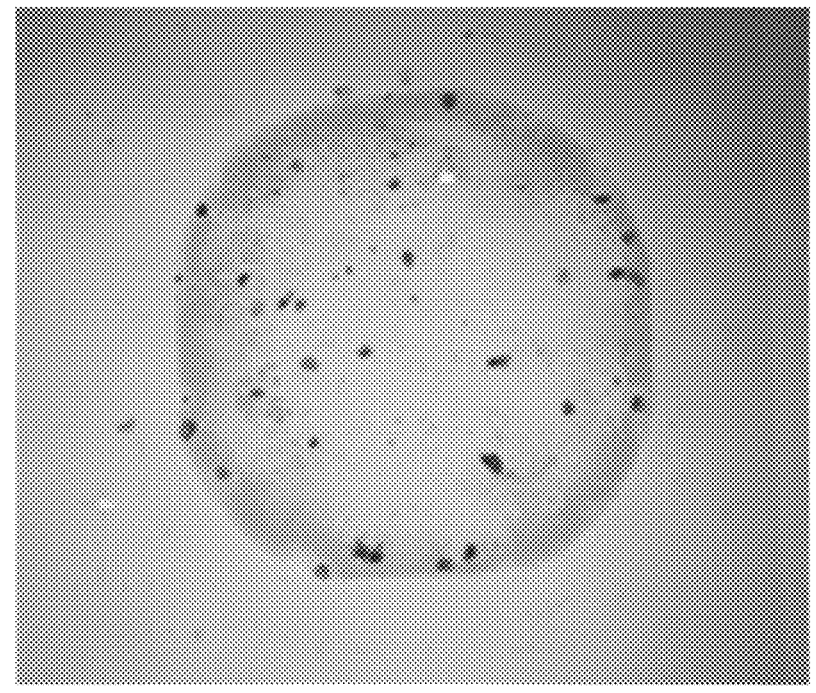
FIG. 14 is an image illustrating microfiltration of a liquid using a microfluidic membrane.

As previously mentioned, the filtering properties of the microfabricated porous membrane were demonstrated with a drop of deionized water. The water passed through the pores in the membrane and forms a drop on the other side, while all particles were filtered by the pores and remained on the membrane surface (see FIGS. 14B, 14C, 14D, 14E, and 14F). FIG. 14A demonstrates the outline of the water drop that is not fully seen since it is already under the membrane and the dark spots are particles that are present in all real world samples and were successfully filtered out by the membrane. For cleaning purposes, the membrane was flushed with acetone. It was observed that this also improved its wetting properties. While without applying additional pressure, water takes several minutes to completely pass through the membrane. However, prior prewashing decreases this time to seconds. The membrane was also tested continuously with the lowest setting of a peristaltic pump pumping fluid with the flow rate approximately 2 $\mu$L/s, and it could withstand the external pressure still demonstrating successful particle filtration.

Figure 15:
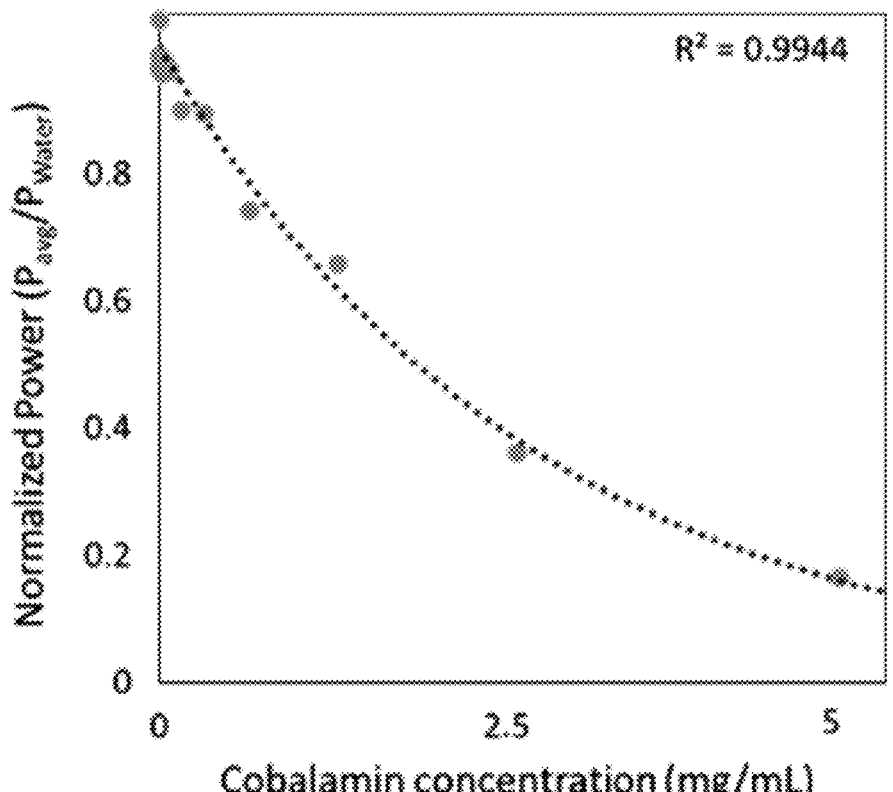
FIG. 15 is a graph that shows the results of optical measurement of cobalamin concentrations.

The aforementioned 0.2 $\mu$g/kg to 1,000$\mu$/kg dosage range translates to a range of concentrations from 1 $\mu$g/ml to 1,000 $\mu$g/ml. FIG. 15 shows measurements of concentrations between 1 $\mu$g/mL to 5 mg/mL to monitor the physiological range and potential overdose. Because cobalamin was the only compound sensed, all the measurements were conducted with a single wavelength, 532 nm, where cobalamin has high absorption and the sensor would have the highest sensitivity. The experimental points are well fitted by the theoretical curve obtained using Beer-Lambert Law ($R^2$=0.994).

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The invention as recited in claims appended to this disclosure is intended to be assessed in light of the disclosure as a whole, including features disclosed in related art to which reference is made.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

What is claimed is:

1. An optical spectroscopy probe comprising:
an optical fiber having a distal tip; and
a microfluidic filtering chamber having an inner volume defined by
(i) sidewalls formed in a substrate of at least one first material, the first material including a semiconductor material,
and
(ii) first and second thin-film layers made of at least one second material that includes at least one of silicon nitride, aluminum nitride, hard oxide, and chromium, said first and second thin-film layers forming a top and a bottom of the microfluidic filtering chamber, respectively, wherein the sidewalls and the thin-film layers enclose a hollow inner space, of the microfluidic filtering chamber, configured to receive a fluid to be analyzed;

wherein at least one of the first and second thin-film layers comprises a plurality of pores that allow the fluid to enter the hollow inner space but prevent particles larger than the pores from entering the hollow inner space; and wherein a facet of the optical fiber is disposed in proximity to a proximal thin-film layer of said first and second thin-film layers while a distal thin-film layer of said first and second thin-film layers is separated from the facet by at least a portion of the inner volume of the chamber.

2. The probe according to claim 1, wherein the facet of the optical fiber is substantially in contact with the proximal thin-film layer outside the microfluidic filtering chamber.

3. The probe according to claim 1, wherein the distal thin-film layer necessarily comprises the plurality of pores.

4. The probe according to claim 1, wherein the pores are approximately 1 μm to 10 μm in diameter or width.

5. The probe according to claim 1, wherein the distal thin-film layer is configured to reflect light delivered from the distal tip of the optical fiber back to the optical fiber.

6. The probe according to claim 4, wherein an outer surface of the distal thin-film layer is coated with a material layer configured to increase the reflectivity of the distal thin-film layer.

7. The probe according to claim 1, wherein the proximal thin-film necessarily comprises the plurality of pores.

8. The probe according to claim 1, wherein the proximal thin-film layer includes an opening therethrough dimensioned to accommodate the distal tip of the optical fiber.

9. The probe according to claim 1, wherein the side walls and the first and second thin-film layers aggregately form a polyhedronal box that defines the hollow inner space.

10. The probe according to claim 1, wherein a height of the side walls is between approximately 100 μm and 1000 μm.

11. The probe according to claims 10, wherein the first and second thin-film layers are approximately 0.3 μm to 3 μm thick.

12

12. The probe of claim 11, wherein the substrate and the first and second thin-film layers are approximately 100 μm to 3000 μm in length and width.

13. An optical spectroscopy probe comprising:

an optical fiber having a distal tip; and a microfluidic filtering chamber comprising one or more side walls made in a substrate of a first material including a semiconductor material, a proximal thin-film layer that is cooperated with the distal tip of the fiber and that is made of a second material, and a distal thin-film layer made of the second material, wherein the one or more side walls extend between and are limited in extent by the proximal thin-film layer and the distal thin-film layer, wherein the second material includes at least one of silicon nitride, aluminum nitride, hard oxide, and chromium, wherein the proximal thin-film layer, distal thin-film layer, and said one or more side walls define and enclose a hollow inner space of the microfluidic filtering chamber configured to receive a fluid to be analyzed, wherein the proximal thin-film layer has an opening in which the distal tip of the optical fiber is received, wherein at least one of the proximal thin-film layer, the distal thin-film layer, and the one or more side walls comprises a plurality of pores that allow the fluid to enter the hollow inner space but prevent particles larger than the pores from entering the hollow inner space.

14. The probe according to claim 13, wherein the distal thin-film layer is configured to reflect light delivered thereto from the distal tip of the optical fiber back towards the optical fiber.

15. The probe according to claim 14, wherein an outer surface of the distal thin-film layer is coated with a metal or a stack of dielectric thin-films.

16. The probe according to claim 13, wherein the pores are approximately 1 μm to 10 μm in diameter or width.

17. The probe according to claim 13, wherein the proximal wall and the distal wall are each approximately 0.3 μm to 3 μm thick.

18. The probe according to claim 13, wherein the one or more side walls are each approximately 100 μm to 500 μm thick and approximately 100 μm to 1,000 μm in height.

* * * * *